(12) United States Patent
Birkenstock

(10) Patent No.: US 11,998,139 B2
(45) Date of Patent: Jun. 4, 2024

(54) SYSTEM FOR PREPARING AND PRESENTING FOOD

(71) Applicant: IP ideas production GmbH & Co. KG, Bad Honnef (DE)

(72) Inventor: Christian Birkenstock, Linz am Rhein (DE)

(73) Assignee: IP ideas production GmbH & Co. KG, Bad Honnef (DE)

( * ) Notice: Subject to any disclaimer, the term of this patent is extended or adjusted under 35 U.S.C. 154(b) by 750 days.

(21) Appl. No.: 17/276,842

(22) PCT Filed: Sep. 23, 2019

(86) PCT No.: PCT/EP2019/075482
§ 371 (c)(1),
(2) Date: Mar. 17, 2021

(87) PCT Pub. No.: WO2020/058526
PCT Pub. Date: Mar. 26, 2020

(65) Prior Publication Data
US 2021/0345825 A1  Nov. 11, 2021

(30) Foreign Application Priority Data

Sep. 21, 2018 (DE) ............ 20 2018 105 430.9

(51) Int. Cl.
*A47J 37/06* (2006.01)
*A21D 13/30* (2017.01)
(Continued)

(52) U.S. Cl.
CPC ........... *A47J 37/0611* (2013.01); *A21D 13/30* (2017.01); *A23G 9/48* (2013.01); *A23P 20/20* (2016.08); *A23P 30/10* (2016.08); *A47J 43/20* (2013.01)

(58) Field of Classification Search
CPC ........ A47J 37/0611; A47J 43/20; A23P 20/20; A23P 30/10; A21D 13/30; A23G 9/48
See application file for complete search history.

(56) References Cited

U.S. PATENT DOCUMENTS 2,670,296 A  2/1954  Tansley
3,736,859 A  6/1973  Carlson
(Continued)

FOREIGN PATENT DOCUMENTS

GB  2307159 A  5/1997
JP  2013146217 A  8/2013

OTHER PUBLICATIONS

Amazon XP055720020 "Bestron Donut Maker"; https://www.amazon.de/-/en/Bestron-Dreams-Design-Non-Stick-Doughnut/dp/B00N8VB7PA/ref=sr_1_2?dchild=1&keywords=bestron+donut+maker&qid=1624528164&sr=8-2; cited in the International Preliminary Report on Patentability dated Sep. 2020.
(Continued)

*Primary Examiner* — Omar Flores Sanchez
(74) *Attorney, Agent, or Firm* — Bejin Bieneman PLC

(57) ABSTRACT

A system for presenting and preparing foodstuffs that include a plurality of individual foodstuff blocks provided formed into basic shapes comprises a heating device including a heatable cooking receptacle for one or more foodstuff blocks with a heatable grill surface and at least one heating mandrel projecting from the grill surface; wherein the heating mandrel is insertable into a passage opening provided in each respective foodstuff block and is adapted to the contour of the passage opening so as to avoid an air gap between the wall of the passage opening and the heating mandrel.

20 Claims, 3 Drawing Sheets

(51) Int. Cl.
*A23G 9/48* (2006.01)
*A23P 20/20* (2016.01)
*A23P 30/10* (2016.01)
*A47J 43/20* (2006.01)

(56) References Cited

U.S. PATENT DOCUMENTS

| | | | | |
|---|---|---|---|---|
| 3,863,020 | A | | 1/1975 | Robinson |
| 3,962,751 | A | * | 6/1976 | Wagner .................. A22C 9/004 |
| | | | | 452/142 |
| 4,106,162 | A | * | 8/1978 | Fournier ................. A23L 13/67 |
| | | | | 426/282 |
| 4,137,333 | A | | 1/1979 | Daswick |
| 5,069,920 | A | * | 12/1991 | Hildebrand .......... H05B 3/0004 |
| | | | | 426/244 |
| 5,145,089 | A | * | 9/1992 | Chang .................. A47J 36/064 |
| | | | | 220/729 |
| 5,397,585 | A | * | 3/1995 | Abernathy .............. A23L 13/67 |
| | | | | 426/478 |
| 2020/0275801 | A1 | * | 9/2020 | Baranoff .............. A47J 37/0611 |
| 2020/0383524 | A1 | * | 12/2020 | Garibaldi Ayarza .. A47J 37/128 |
| 2021/0244228 | A1 | * | 8/2021 | Dash ..................... A47J 37/0611 |
| 2023/0090360 | A1 | * | 3/2023 | Klebanov ............ A47J 37/0611 |
| | | | | 99/372 |
| 2023/0092589 | A1 | * | 3/2023 | Julemont ............ A47J 37/0635 |
| | | | | 219/450.1 |
| 2023/0097972 | A1 | * | 3/2023 | Locricchio .............. A47J 29/00 |
| | | | | 99/440 |
| 2023/0380633 | A1 | * | 11/2023 | Bourgeois ............... A23P 20/20 |

OTHER PUBLICATIONS

International Search Report and Written Opinion for PCT/EP2019/075482 mailed Dec. 2, 2019 (16 pages; with English translation).
International Preliminary Report on Patentability for PCT/EP2019/075482 mailed Dec. 15, 2020 (5 pages).

\* cited by examiner

SYSTEM FOR PREPARING AND PRESENTING FOOD

CROSS-REFERENCE TO RELATED APPLICATIONS

This application is a national stage of, and claims priority to, Patent Cooperation Treaty Application No. PCT/EP2019/075482, filed on Sep. 23, 2019, which application claims priority to German Application No. DE 20 2018 105 430.9, filed on Sep. 21, 2018, which applications are hereby incorporated herein by reference in their entireties.

BACKGROUND

Systems for the presentation and preparation of foodstuff in a wide variety of ways are known. In the simplest case, food products are put on the market as foodstuff blocks. These can be, for example, patties, i.e. slices of minced meat, poultry, meat substitutes or other foodstuffs for the preparation of hamburgers, or foodstuffs frozen in cube form, such as spinach, which can be removed in portions from a package. Cheese, for example, is also offered in slices as processed cheese for gratinating foods, just like puff pastry or other foods.

The various food presentation forms are very helpful in daily processing, but have the disadvantage that only individual components are offered for further processing in this way. In particular, there is often a lack of coordination, both in the form and in the quantity of the individual components, so that the user has to keep a plurality of foodstuff blocks ready in an outer packaging, which then has to be opened or stored closed again after individual foodstuff blocks have been taken out. For understandable reasons, this is only possible in conjunction with frozen or dried foods over a longer period of time.

However, it would be helpful to have a system that simplifies the preparation of a finished dish by delivering quantities that are matched to each other in terms of content and weight. Although delivery services have existed for some time that deliver the exact quantity of food required when a recipe is processed, this has the disadvantage that the user can only order the food after selecting the desired recipe and that comparatively high packaging and delivery costs are necessary. Also, although in this way the user is provided with exactly the amount of food that he needs to re-cook the recipe, the cooking itself is not simplified.

Furthermore, a comparatively long lead time is required for the order after selecting the desired recipe and the user must of course be at home in order to be able to receive the partly refrigerated or even frozen goods and store them appropriately. Finally, delivery of the goods requires a great deal of transport and packaging, since the individual ingredients must be shipped and delivered quickly if they are perishable goods and are usually then packaged individually.

The previously described disadvantages lead to the fact that the known systems for the presentation of food are not suitable for the spontaneous and simple preparation of a meal.

SUMMARY

Disclosed herein is a system for the preparation and presentation of foodstuffs, in which both the storage and the selection of the necessary components are simplified with the greatest possible number of variations for the preparation of a dish, and at the same time the preparation is easily accomplished with the least possible expenditure of time. Furthermore, the system is suitable for providing the freshest and healthiest food possible and at the same time, despite the preconfigured provision, bring with it a special experience in the preparation and enjoyment of the finished dish, which should be clearly different from usual ready-made meals.

The system for the presentation of foodstuffs comprises first of all the basic idea of producing individual blocks of the foodstuffs or the most varied forms of foodstuffs and making them available for processing. In this context, the very shape of the individual foodstuff blocks is something special and creates a memory value or a brand value for the consumer, with which he can recognize the quality and the further advantages of the system already via the shape. The foodstuff blocks of the system are preferably matched in size and function. A further basic idea of the system according to the invention is to provide suitable preparation devices in the form of heaters, via which the foodstuff blocks equipped according to the invention can be cooked particularly easily and gently.

Thus, groups of foodstuff blocks with the same shape may be available, or kits consisting of a block core and further foodstuff layers may be available, from which a foodstuff block can then be assembled.

It is conceivable, for example, that the user can stock different foodstuff layers and, if necessary, also different block cores in a packaging and, if necessary, assemble the desired product to suit his taste. The foodstuff blocks produced in this way or selected solid foodstuff blocks are further processed or prepared or may also be ready to eat, depending on the type of food contained therein and how they are stored.

The types of food that can be served through this system are largely unrestricted. Thus, all forms of food can be presented to the consumer in separately other or in the context of combinations for the preparation of special meals according to a provided recipe. In the following, the invention is illustrated by means of individual, particularly preferred examples, whereby the diversity of the variants described already indicates that the scope of application of the present disclosure is essentially not limited.

In the simplest case, a foodstuff block includes a single food or the preparation of a food. This can be, for example, meat pressed into shape, meat cut into the respective shape, shaped minced meat or a more or less homogeneous mixture of meat components with further components, in particular spices, sauce content or the like. Instead of meat, fish, game or vegetarian components, for example tofu, can of course also be offered in the same way. Foodstuff blocks made of vegetables, rice, pasta or other components, in particular sauce components or seasoning components, can also be formed into foodstuff blocks in this manner. The foodstuffs contained in this foodstuff block can be processed into the foodstuff block raw, pre-cooked or cooked through.

A feature lies not only in the composition of the foodstuff block but also in the shape of the foodstuff block. In addition to the value of recognition that the foodstuff block belongs to the system, the shape in particular enables further advantages. For example, there can be provided in the foodstuff block at least one passage opening which can be used both for preparation purposes and optionally for further purposes.

The foodstuff block can be heated more favorably and better initially via the shaping. A central or off-center passage makes it possible to introduce the cooking temperature more favorably into the foodstuff block. Even during normal heating on a conventional stovetop or griddle, heat can penetrate into the core of the foodstuff block via this passage opening, allowing it to cook through more quickly. However, it is preferred if the surface for heating the foodstuff block has protrusions that extend into the passage opening and thus enable cooking, in addition to cooking via the support surface starting from the center of the foodstuff block. This effect can of course be enhanced if further passages are provided.

In addition to the cooking acceleration effect described above, the surface design of the foodstuff blocks can be used to optimize the coupling of the cooking temperature into the foodstuff block. For example, depressions distributed over the surface of the foodstuff block can provide local maxima of the coupled heat. Depending on the desired cooking behavior of the foodstuff block, the surface of the foodstuff block can thus be flat, concave or convexly rounded, or also formed with depressions, in particular in the form of concave depressions or grooves. Conversely, of course, elevations can also be provided in order to be able to create, for example, a grill pattern in the manner of a grate or other patterns, in particular logos, decorations, etc., despite a flat grill plate.

The foodstuff blocks can be almost any shape. The most favorable will be cuboid or disk-shaped or cylindrical foodstuff blocks. However, depending on the specific application, more unusual shapes may also be used, especially if this is desired for marketing reasons or if the composition of the foodstuffs for later consumption or for preparation suggests such a shape. For example, for children, shapes in the manner of a face or other fancy shapes can be chosen. If the foodstuff blocks are to be used to assemble entire dishes which, as will be described later, can be provided after the foodstuff blocks have been prepared together and fallen apart on a plate as a plate dish attractive in appearance and taste, shapes can also be selected which take into account the later positioning of the individual components on the plate.

Further, the foodstuff blocks may also have other openings or other shaping details. For example, a passage extending transversely to the passage opening may be provided so that the foodstuff blocks can be threaded onto a skewer for subsequent grilling, for example. In this case, the foodstuff blocks are then preferably cuboidal, spherical or cylindrical in shape so that the user can, for example, keep a plurality of such foodstuff blocks on hand and then assemble different types of foodstuff blocks to form an attractive barbecue skewer for producing the desired skewer. Due to the uniform shape of the individual foodstuff blocks, they can be easily stored and take up little space in the freezer, for example.

However, the foodstuff blocks may not only be homogeneously composed of one material or a mixture of materials. Another aspect of the present disclosure also includes the fact that the foodstuff block either already comprises multiple layers by the manufacturer, or that multiple layers can be provided to the user so that the user can choose the composition of the foodstuff block. For example, a foodstuff block may have a middle layer of meat or vegetables, which may then be covered by additional layers at the top and bottom. The additional layers may be layers of seasoning or layers of another food product. In particular, pasta or even bread in the manner of a bun of a hamburger can be considered here, for example. Cheese or bacon can also be added via this additional foodstuff layer.

Here, too, if the multilayer foodstuff block is not delivered already preconfigured, the user can be provided with an assortment so that he can select and assemble the individual foodstuff layers himself. Preferably, the thickness of the foodstuff layers is selected in such a way that the cooking time and cooking temperature are as uniform as possible for all possible combinations, so that the probability of errors is significantly reduced. This significantly simplifies the preparation of the finished food and ensures increased user satisfaction.

The individual foodstuff layers can preferably have surfaces which are matched to one another in such a way that a form fit is produced in the transverse direction to the surface of the layers. This prevents the individual foodstuff layers from shifting relative to one another during preparation or subsequent consumption. At the same time, for example in the case of flavoring layers, increased penetration of the flavoring into the adjacent layer can be achieved. Finally, of course, this design can also be used to achieve self-centering when assembling the foodstuff block consisting of the individual foodstuff layers or even forced alignment, if this is required.

A specific food product that can be produced in this way can be, for example, the hamburger already mentioned. This then has a central foodstuff layer formed by a minced meat patty. The user may then be provided with a system comprising further optional foodstuff layers, which system may then include the usual ingredients for a hamburger. For example, these may include bacon slices, cheese slices, and the covering bread slices. However, innovative solutions can also be provided via the system. For example, an Asian-style burger may also include a fish patty and additional foodstuff layers in the form of seaweed or other ingredients.

Sauces, fried onions, hot peppers or jalapeno pieces can either be contained in a single layer, which is particularly useful for frozen foodstuff blocks, or they can be embedded in a matrix that either disintegrates during subsequent preparation or remains part of the finished product. For example, a sauce may be integrated into the meat patty as an embedded layer. However, the components can also be contained in a layer of rigid edible fat, which then simultaneously provides the necessary fat for a juicy burger during preparation.

Another specific product may be, for example, a lasagna. Thus, a layer of cheese and a layer of pasta can be arranged above and below a central layer of minced meat mixed with sauce, so that the stack built up in this way can be heated and a finished lasagna is then available. Also, in this case a system for self-configuration by the user can be provided that, for example, instead of the layer with the minced meat, provides a layer with fish, a vegetarian layer with tofu portions or a vegetable layer. This allows the user to choose the desired amount of cheese, any other ingredients, and the main component. Seasonings can either be included in one of the layers, especially in the cheese layer, or sprinkled between the layers, or supplied as a separate seasoning layer.

However, the disclosure is not limited to the presentation of food that is heated for preparation. In the same way, ice cream can also be presented, as well as chilled ice for beverages. In the case of chilled ice, the design can initially indicate that it belongs to the innovative system. But here, too, further effects can be implemented, then preferably but not necessarily of an optical nature. For example, the passage opening can be filled with an ice of colored water or contain a material that, after thawing, is distributed in the beverage and either serves visual purposes there or serves as an ingredient. For example, such an ice cube may contain a flavoring material in the passage opening so that one or more such foodstuff blocks present in the form of ice cubes can be placed in a glass that is subsequently filled with water or another beverage. The dewing foodstuff block or the filling in the passage opening can then secrete flavors, resulting in a flavored beverage.

In the case of ice cream, either different types of ice cream can be combined, or layers of chocolate, layers of sponge cake, layers of egg whites or other ingredients, in particular sauces, fruit pulp or even cream can be combined to form a foodstuff block. Again, the passage opening can be functionally used to fill the foodstuff block or can also be used to cool the ice cube. For example, a dispenser can be provided that has a central metal mandrel with high heat capacity so that it can provide a low temperature for an extended period of time after removal from the freezer. Ice cubes can then be placed on this central mandrel so that the user can remove them one at a time. A cooled outer wall can additionally delay thawing of the ice cubes.

Both the foodstuff blocks and, if the foodstuff blocks are composed of a block core and foodstuff layers, the respective individual layers, can consist of slices of food or other ingredients. Loose packages can also be shaped and then deep-frozen, bonded together via adhesion promoters, in particular coagulated egg white or other bonding, food-safe substances. Simple deep-freezing is also possible, of course. In this case, the foodstuff blocks or the individual layers can be designed in such a way that they remain solid or disintegrate during thawing or preparation. This depends in each case on the area of application, depending on whether the basic shape of the foodstuff block is to be retained or whether the impression is to be created that a loose food product has been processed from the outset.

For example, the user may remove three food items from the freezer and arrange them on a plate, which the user then heats in the microwave, for example. A meat composite may retain its shape, while a rice composite and a vegetable composite may disintegrate and thus be presented on the plate in a common shape. Also, within a foodstuff block, layers may remain stable during preparation and other layers may be formed to liquefy or disintegrate. For example, the top layer of food may be solid when frozen, but after thawing may melt like gravy over the lower layers. The same applies to middle layers, which do not necessarily have to liquefy but can merely become soft, as is the case, for example, with the middle layer of a lasagna.

The individual foodstuff blocks, the foodstuff layers or the block core can also consist of pressed meat, whereby this can either be done in a known manner, so that during preparation the meat composite continues to adhere to each other and the impression of a coherent piece of meat is created, or that the meat composite falls apart during heating or already during thawing. In order to control these effects, a coating of the wall of the individual components of the meat composite can be selected which either produces a greater adhesive bond, for example, by means of applied proteins, or produces exactly the opposite effect by means of appropriate release agents, which can be achieved, for example, by means of an oily or fatty coating.

Furthermore, larger foodstuff blocks can also be provided in the system, which can include predetermined breaking points. Here, the user can then break off one piece at a time, either before or after preparation, in order to obtain the desired base material.

A food delivery system according to the disclosure can comprise a plurality of different components in the form of foodstuff blocks, foodstuff layers and block cores. These can be selected and combined with each other depending on the desired application. For example, the respective desired components can then either be prepared parallel to each other, stacked on top of each other, or even placed on skewers.

The foodstuff blocks can be used, as described above, to assemble a food product, plate dishes or a composite of food products, such as in the form of the skewer. Purely decorative applications, for example as ice cubes without any other function to complement the range of the system, are also possible. Further, the foodstuff blocks may be ready-to-eat or may be designed to still be individually prepared by thawing, heating or cooling or otherwise.

BRIEF SUMMARY OF THE DRAWINGS

Further features and advantages will be apparent from the following description of preferred embodiments based on the drawings.

In the drawings.

DESCRIPTION

Figure 1:
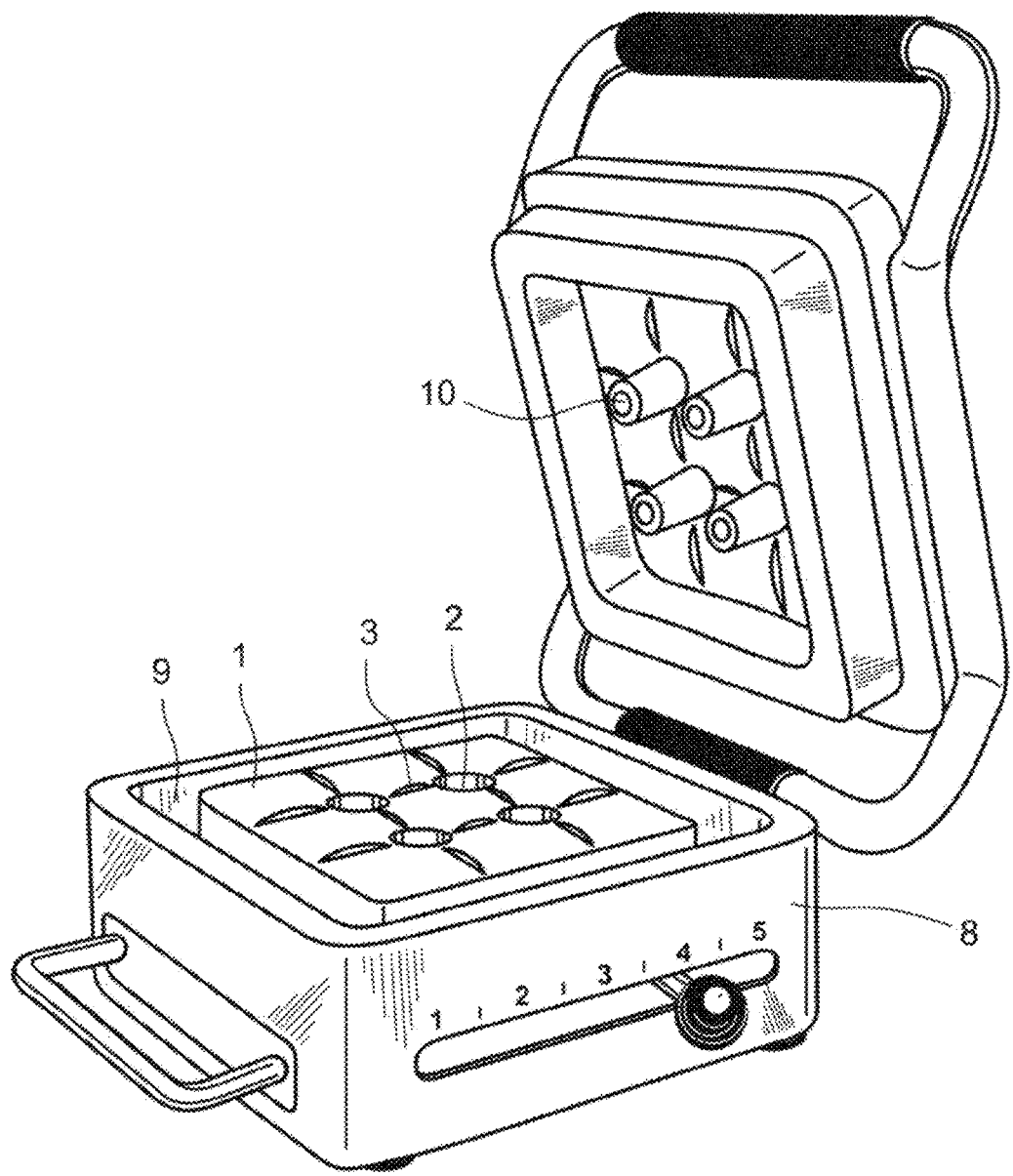
FIG. 1 illustrates an example heater for use in conjunction with the present system.

FIG. 1 shows a heating device 8 for use in connection with the present system. The heating device 8 is designed here in the manner of a waffle iron and has, by way of example, only one receptacle 9 for receiving a foodstuff block 1. Of course, the variety of combinations is almost unlimited here; any number of receptacles 9 may be provided side by side or one behind the other, spaced apart or merging into one another. For the sake of simplicity, the smallest heating device 8 with only one receptacle 9 is described here.

The heater 8 has a lower base body, which may here have a slider on the right-hand side for setting the temperature or the heating duration. Of course, two separate controllers for the two functions may also be provided. In particular, a timer circuit can also be provided which automatically switches off the heater 8 after a predetermined or set heating duration has been reached, issues an alarm and/or automatically opens the lid, which is then closed under the pretension of a spring device. In a more elaborate solution, these functions can be controlled by control electronics, and optionally a reading device can also be provided via which the heating device 8 can read in the necessary preparation regulations or entire recipes. Such a reading device may in particular be designed to be able to read a QR code, a barcode or any other coded instruction.

In case of the embodiment shown in FIG. 1, the device is provided with only one slider. In the base body, a lower part of the receptacle 9 for the foodstuff block 1 is provided in the form of a recess in the surface of the base body. The base body itself is cuboidal in shape and has four feet for standing and a front handle for handling, which may be thermally insulated so as not to heat up. The same applies, of course, to the wall of the base body.

The lid is hinged to the base body. Preferably, this connection is designed in such a way that it results in a lifting hinge, i.e., a hinge that does not move the lid exclusively rotationally but provides an upstream translational movement. This has the advantage that the opening of the lid does not damage the prepared food.

The upper part of the receptacle 9 is provided in the lid itself. Here, heating mandrels 10 protrude from the upper side downwards, which dip into the passage openings 2 in the foodstuff block 1 when the lid is lowered. The heating mandrels 10 are adapted in size to the contour of the passage opening 2. This avoids an air gap between the wall of the passage opening 2 and the heating mandrel 10, which optimizes heat transfer. However, since there is no gap between the heating mandrel 10 and the inner wall of the passage opening 2, it is advisable to first pull the heating mandrel 10 translationally out of the passage opening 2. The lifting hinge described above is provided for this purpose, although such a translatory movement of the cover can of course also be realized in another way. The translatory movement should be so large that the heating mandrel 10 is pulled out of the passage opening 2 with the largest area thereof. It can be kept somewhat smaller if the heating mandrel 10 tapers downward, since a gap then already results from a small opening movement.

Alternatively, of course, in the case of a heater 8 that has a pure swivel lid, the heating mandrel 10 may also be adapted to the swivel movement in its shape so that the heating mandrel 10 rotates out of the passage opening 2 along the wall of the passage opening 2 when the lid is opened. In addition, or alternatively thereto, the inner contour of the passage opening 2 may also be shaped accordingly.

The heater 8 shown in FIG. 1 is part of a food preparation system. This system essentially uses foodstuff blocks 1 that are optimized for this system. These can be any form of food prepared either by cooling or by heating. Mixtures of food products, which will be described further below, are also considered here. Heating can be both heating via a grill or similar oven function and heating in a water bath, for example according to the so-called sous vide cooking technique.

In a further alternative, the heating device 8 is designed in such a way that the heating mandrel 10 is automatically retracted into the plane of the grill surface after a predefined or adjustable cooking time, preferably with the grill surface arranged at an angle and with a collecting tray for fully cooked foodstuff blocks 1 provided below the grill surface.

When using the sous vide cooking technique, the foodstuff block 1 is heated in a heating device 8 that has a temperature-controlled water bath. Heating mandrels 10 can also be used here, which are then of course heated to a lower temperature to protect the film with which the foodstuff blocks 1 are wrapped using the vacuuming technique. In this device, the temperature of the water bath can be controlled either exclusively via the heating mandrels 10 or also via a separate heating device.

To encapsulate the foodstuff blocks 1, they are first placed in a suitable film bag, which is then vacuumed. Subsequently, the film can be pressed through the passage openings by means of a press die in the area of the passage opening 2, possibly also with the use of heat, punched in this area and then sealed. To ensure that this is done without drawing in air, this is best done under vacuum. Alternatively, of course, the foodstuff block 1 can be covered on one side with a film which is either already provided in advance with appropriate shaping or which, after being covered, is pressed down into and through the passage opening 2, the opposite side and the edges then also being covered with film and the films then being welded. Provided that the passage openings 2 are to remain free, the film can then be punched out in this area. Ultimately, the method of production of the foodstuff blocks 1 sealed in vacuum bags is a question of the quantities to be produced.

Foodstuff blocks 1 not sealed under vacuum in foil can be prepared immediately. An advantage is that by using the heating mandrels 10, heat can also be introduced directly into the foodstuff block 1, so that, in conjunction with the fact that the foodstuff block 1 has a fairly small thickness, fast and reliable preparation becomes possible. In particular, the foodstuff block 1 can also be introduced into the heating devices 8 in a frozen state and thus be prepared ready for consumption from the frozen state.

For the preparation of the foodstuff block 1, the heating device 8 is controlled accordingly. This can be done manually or also using pre-programmed sequences, as is already known today from the field of steam cookers, for example. Preprogrammed sequences are particularly suitable if, for example, a foodstuff block 1 is first to be defrosted and it is then to be grilled under higher heat. A phase of lower heat at the beginning of the preparation prevents overcooking of the outer layers. Also, of course, the user can select the degree of cooking in such sequences and the programming of the control system can reliably ensure that the desired result is achieved.

If the programming of the sequences has not already been integrated into the controller of the heater 8 at the factory, this can be done either via a user dialog that the electronics conduct with the user via suitable input means or also via the automated reading of a sequence into the heater 8. An exemplary embodiment for such an automated read-in consists in reading in a code, for example a QR code or a bar code. This can either already mean the direct reading in of the sequences, which are then stored in the code, or can also only be the reading in of a reference, for example an Internet address, via which the required data can be automatically retrieved by the heater 8.

An advantageous further example uses external software, also in the form of an app stored on a smartphone or tablet, to facilitate preparation. Recipes and also control instructions can be stored in this software. This allows the user, in addition to accessing collections of ideas, to influence the preparation in certain cases, for example by selecting a degree of cooking or by choosing a more or less crispy surface. Also, of course, the software can provide instructions to the user during preparation. For example, the user may be prompted to sequentially feed different blocks of food into the heating device 8, either side by side or stacked on top of each other.

For example, if a foodstuff block consisting of meat is to be scalloped with cheese, the user may be prompted to place the cheese slice after an initial cooking period. Also, the user may be prompted to open the heating device 8 after an initial cooking phase or at the beginning of the preparation to allow a gentle cooking process without the grill function. There are virtually no limits to the variety here; ultimately, this depends on the type of food and the particular recipe. Of course, the instructions can also be provided via other sources, for example cookbooks or a website, or via the heating device 8 itself. The instructions may be transferred to the heating device 8 in an automated manner, or they may be displayed to the user only visually or via sound output. In particular, however, controlling the heater 8 in accordance with the instructions will be a particularly advantageous solution, since in this case an incorrect operation, for example due to incorrect temperature selection, can be avoided from the outset.

Figure 3:
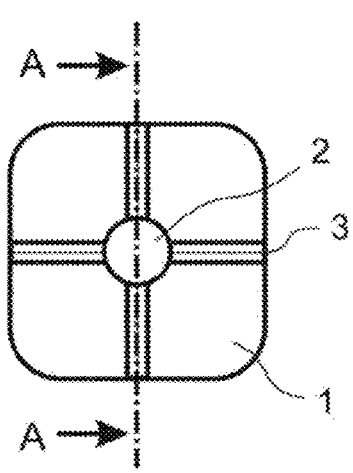
FIG. 3 illustrates the foodstuff block shown in FIG. 2 in a plan view.
Figure 2:
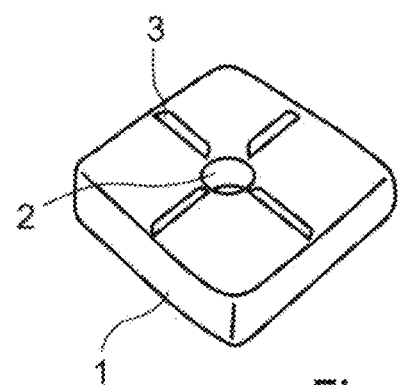
FIG. 2 illustrates an example of a first embodiment of a foodstuff block.

FIG. 2 and FIG. 3 each show a foodstuff block 1 for use in conjunction with the system, which has a central passage opening 2. The foodstuff block 1 has the basic shape of a cuboid and has depressions 3 on its surface and its underside (not visible here). These depressions 3 can serve to better couple the heat of a cooking device into the surface at these points. The same function can be performed by the passage opening 2.

Figure 4:
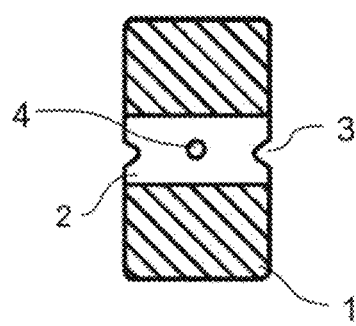
FIG. 4 illustrates the foodstuff block shown in FIGS. 2 and 3 in a sectional side view.
Figure 9:
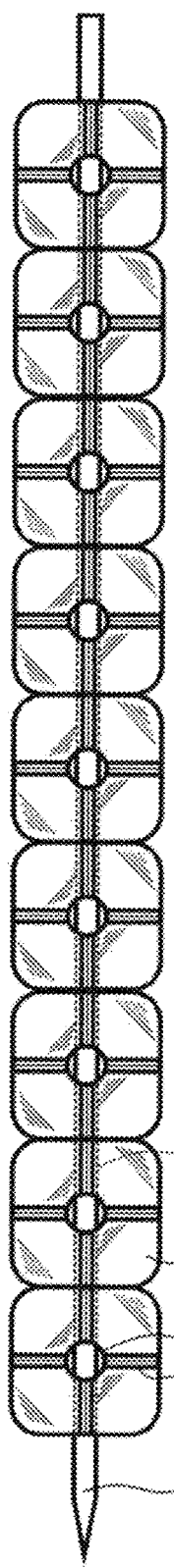
FIG. 9 illustrates a barbecue skewer assembled from foodstuff blocks.

FIG. 4 shows the section A-A from FIG. 2. Here it can be seen that the foodstuff block 1 has a passage 4 at right angles to the passage opening 2. This passage 4 can be used, for example, to insert a skewer 5 through the foodstuff block 1, as can be seen in FIG. 9. This can be used to select, as desired, from the freezer or refrigerator the desired type of foodstuff blocks 1 and assemble them into a skewer to be then prepared on the grill. The foodstuff blocks may contain or consist of meat, fish, vegetables or fruit.

Figure 5:
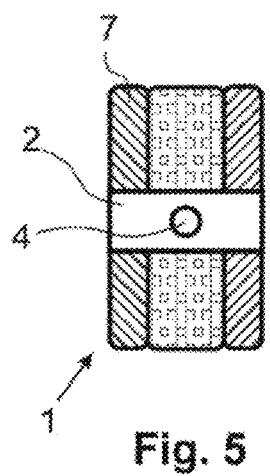
FIG. 5 illustrates an alteration of the foodstuff block shown in FIGS. 2 to 4.

FIG. 5 shows a variation of a foodstuff block 1 comprising a block core and foodstuff layers 7. Such a foodstuff block 1 can be prefabricated, in which case the individual layers of the foodstuff block 1 are preferably already formed at the factory so that they adhere firmly to one another. This can be done via a protein compound, via deep freezing after joining or via other measures, in particular via an adhesion promoter. This foodstuff block 1 also has a central passage opening 2 extending through the entire foodstuff block 1. However, this is not absolutely necessary. Provided, for example, that the foodstuff layers 7 become liquid during preparation, the passage opening 2 could also be provided only in the region of the block core. Here, too, a passage 4 is provided for attachment to a skewer 5.

Figure 6:
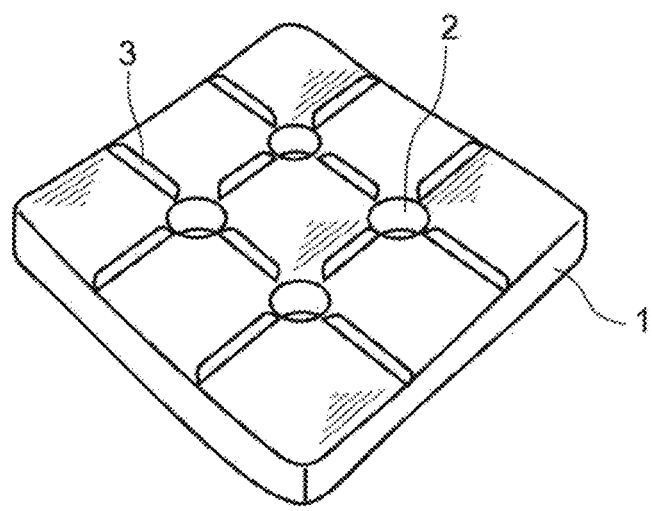
FIG. 6 illustrates a further foodstuff block comprising depressions and predetermined breaking points.

FIG. 6 shows a further form of foodstuff block 1. Here, the foodstuff block 1 consists of a larger base body which, like the foodstuff blocks 1 shown in FIGS. 2 to 5, has depressions 3 on its upper side and its underside. Here, the indentations 3 can serve as predetermined breaking points, so that the foodstuff block 1 can be divided into partial blocks by breaking off individual parts. This can be done before preparation or even during consumption. The depression 3 may be of any depth and, as in the example embodiment shown, may extend from the edge to the passage openings 2. Provided that no passage openings 2 are provided, the depressions 3 can also extend from edge to edge.

Figure 7:
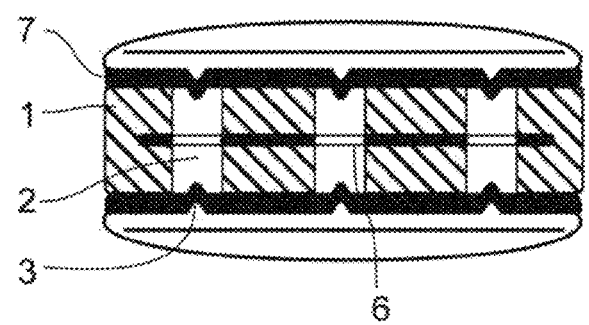
FIG. 7 illustrates an example assembled food product.
Figure 8:
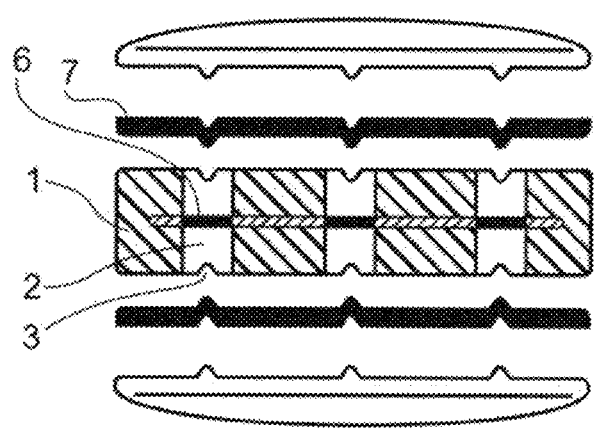
FIG. 8 illustrates an exploded view of the food product shown in FIG. 7.

FIGS. 7 and 8 show an exemplary application of the system according to the invention for the presentation and preparation of foodstuffs. Here, a foodstuff block 1 is produced by combining a block core with further foodstuff layers 7.

The block core has a filling 6 which can provide, for example, a sauce. A spice filling can also be introduced, of course. In one example, the block core is a meat patty. Above and below the top of the block core, two foodstuff layers 7 each are provided here, by way of example, with, for example, an upper and a lower foodstuff layer 7 directly abutting the block core, as a cheese layer and/or in the form of bacon. Ultimately, there is no limit to the scope of design here. In the example shown, one foodstuff layer 7 is provided below and one above, which is in the form of a slice of bread or half of a bun.

The individual foodstuff layers 7 as well as the block core are provided with embossings so that a form-fit connection of the stack results in the transverse direction. In this way, for example, the annoying slipping out of the block core can be prevented when eating the hamburger-like food product.

FIG. 9 shows, as mentioned above, another application. Here, several foodstuff blocks 1 are arranged in a row on a spit 5. These foodstuff blocks 1 also have passage openings 2 and depressions 3, the spit 5 being inserted through passages 4 in the foodstuff blocks 1. The depression 3, as well as the passage opening 2, can be used here to optimally introduce the heat of a grill into the foodstuff blocks 1. The passage opening 2 can further be used, for example, to deposit a barbecue sauce here, which then flows out of the reservoir formed by the passage opening 2 when heated. Cooking fat can also be deposited here, so that the barbecue skewer can be prepared in a pan without adding any further fat.

Figure 10:
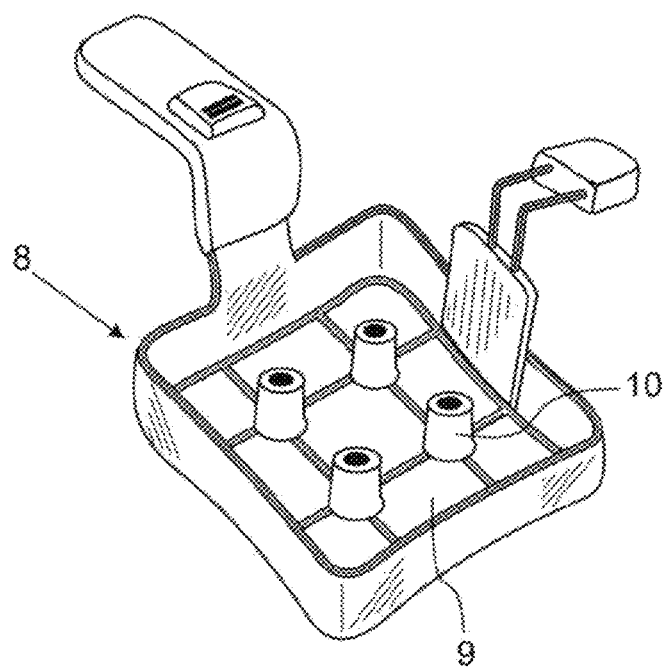
FIG. 10 illustrates a passive heating device for use with the present system.

FIG. 10 shows an alternative embodiment of a heating device 8. In this embodiment, the heating device 8 is designed as a passive heating device 8. The heating device is used, for example, to be heated in an oven or in a pan. Special devices may also be used, for example having a rectangular receptacle shape or support on which the heaters 8 shown in FIG. 10 may be placed side by side and/or one behind the other.

To heat the heater 8 shown in FIG. 10, it is heated in particular from below via heat conduction. In the embodiment shown, the foodstuff block 1 is inserted into the heater 8 from above, completely filling the receptacle 9. Alternatively, of course, the receptacle 9 can also be designed in such a way that several foodstuff blocks 1 can be inserted next to each other.

The foodstuff block 1 is heated and cooked within the receptacle, as in many other embodiments of the invention, via the heat conduction of the heating mandrels 10 and via the heat input from below or via the side wall of the receptacle 9. For this purpose, the heating mandrels 10 may have special cores or coatings that are optimized with respect to heat conduction. The same applies, of course, to the base area, which can be provided with a honeycomb structure, for example in the manner of a frying pan. The walls can also be equipped accordingly. All areas that come into contact with the foodstuff block 1 are preferably provided with a non-stick coating. This may be, for example, a coating of PTFE plastic, also known by the trade name Teflon.

A removal device is provided in the right-hand area of the heating device 8. The foodstuff block 1 can be placed on a disc which can be placed on the heating mandrel 10 and has the elevations shown here for dipping into the depression 3 of the foodstuff block 1, this disc then being inserted into the receptacle 9 with the handle shown on the right. The disc naturally has corresponding depressions for the passage of the heating mandrels 10. As an alternative, the heating mandrels 10 can also be arranged on the disc or engage in bump-like protrusions on the disc. This has the advantage that, once the foodstuff block 1 has been prepared, the user can remove it particularly easily and wipe the prepared foodstuff block 1 laterally from the disc or detach it from the disc by inverting the disc. Again, all parts that the user touches as intended are provided with a thermo-insulating property.

The system can be used for a wide variety of food products, whereby it is particularly interesting here that the user recognizes that the basic system is always the same and that the quality expectation that exists with him can be fulfilled by this. For example, the foodstuff block 1 can also be a rice block, whereas a fish component can be provided in the passage opening 2, for example, to build up a sushi-like food product. For this purpose, of course, the passage opening 2 may be made correspondingly larger. Alternatively, a seasoning marinade may also be provided, while the fish component is provided as the upper foodstuff layer 7.

LIST OF REFERENCE SIGNS

1 Foodstuff block
2 Passage opening in the foodstuff block
3 Depression in the foodstuff block
4 Passage of the foodstuff block
5 Skewer
6 Filling
7 Foodstuff layer
8 Heating Device
9 Receptable
10 Heating mandrel

The invention claimed is:

1. A system for presenting and preparing foodstuffs that include a plurality of individual foodstuff blocks, the system comprising:
a heating device including a heatable cooking receptacle for one or more foodstuff blocks with a heatable grill surface and at least one heating mandrel projecting from the grill surface;
wherein the heating mandrel is insertable into a passage opening provided in each respective foodstuff block and is adapted to the contour of the passage opening so as to avoid an air gap between the wall of the passage opening and the heating mandrel.

2. The system of claim 1, wherein the foodstuffs are ready-to-eat foodstuffs.

3. The system of claim 1, wherein the receptacle has two mutually adjustable grill grids provided to accommodate one or more foodstuff blocks therebetween.

4. The system of claim 1, wherein the heating mandrel has a length that corresponds to the depth of the passage opening in the foodstuff block.

5. The system of claim 1, wherein the foodstuff blocks as an input component for the preparation are composed of a plurality of raw or pre-cooked foodstuff layers and of a block core consisting of a foodstuff or a foodstuff mixture, the foodstuff layers and the block core having (a) an identical foot print, or (b) a foot print which deviates by a maximum of 20% in the longitudinal and transverse extent of the foot print of the block core or of another foodstuff layer.

6. The system of claim 5, wherein the block core and the foodstuff layers, after being stacked one on top of the other, are positively connected to one another in a transverse direction via mutually corresponding embossed or raised regions.

7. The system of claim 4, wherein the foodstuff block has at least one of (a) edges that are indented, bulged, or rounded, or (b) a shape that includes at least one of a cylinder, a sphere, a cuboid, a cube, or a multi-sided prism.

8. The system of claim 1, wherein the foodstuff block has at least one surface running along a flat or curved plane, in which surface, in order to form a predetermined breaking line or in order to enlarge the surface of the food block, curved or rectilinear depressions are made, which at least one of form a symmetrical pattern on the surface of the food block or are rectilinear and comprise at least two depressions arranged at right angles to one another.

9. The system of claim 8, wherein the area between the depressions is shaped to have a convex or a concave surface, and the food block has at least one pair of opposing surfaces, wherein opposing depressions are provided.

10. The system of claim 1, wherein at least one foodstuffs block is provided having a plurality of passage openings extending around the center of gravity of the foodstuff block.

11. The system of claim 1, wherein at least one foodstuff block is composed of individual foodstuff blocks, which are joined together by pressing or deep freezing to form a single foodstuff block or a block core.

12. The system of claim 1, wherein the assembled foodstuff block has predetermined breaking points by which it can be divided into the individual foodstuff blocks, the predetermined breaking points being formed by depressions or before the assembly by a less adhesive coating of the edge regions of the individual foodstuff blocks.

13. The system of claim 1, wherein a plurality of foodstuff blocks are provided that each have passages extending at an angle to the passage opening for inserting or passing through skewers or sticks.

14. The system of claim 1, wherein the heating device is configured such that the heating mandrel is retracted into the plane of the grill surface after a predefined or adjustable cooking time.

15. The system of foodstuffs of claim 1, wherein, the grill surface is arranged obliquely and a collecting tray for fully cooked food blocks is provided below the grill surface.

16. The system of claim 2, wherein the heating device is an active heating device and is equipped with a plurality of receptacles for receiving in parallel foodstuff blocks or at least one foodstuff block or a block core and at least one further foodstuff layer, wherein the heating device is configured such that the heating temperatures or starting times of the heating function of the individual receptacles are matched to each other and to the type of food layers to be cooked in the receptacles such that the foodstuffs positioned in the individual receptacles are fully cooked at a common time.

17. The system of claim 1, wherein the heating device has a control and a reading device for a cooking instruction, wherein coded cooking instructions are associated with the foodstuff blocks, which cooking instructions can be read by the reading device, and wherein the control is configured to start and run a cooking program comprising at least one heating process indirectly or directly from the cooking instruction, and wherein the coded cooking instructions are embodied in the form of a bar code or QR code.

18. The system of claim 1, wherein the heating device is connectable to a global or local computer network for information regarding length and temperatures input into control electronics via the computer network; wherein the heating device is configured for preparing the foodstuff in conformity with the information received via the global or local computer network.

19. The system of claim 1, wherein the heating device comprises a base body, at least one lid embodied movably on the base body, and a heater for heating at least one of at least a part of the lid or the base body in the region of the receptacle, wherein the base body and the lid are configured such that, when the lid is lowered onto the base body, the receptacle is formed or a plurality of receptacles are formed between the base body and the lid, and wherein, starting from the lid and/or the base body, at least one heating mandrel, which is adapted in its shape to the passage openings in the food block, extends into the receptacle and, when the lid is closed in the passage opening, penetrates the receptacle.

20. The system of claim 19, wherein the lid is connected to the base body via a lifting joint comprising a lever mechanism, which is configured such that during a first partial opening movement the lid is translationally spaced from the base body and only in a subsequent partial opening movement the lid is also pivoted in addition or as an alternative to the translational movement.

* * * * *

UNITED STATES PATENT AND TRADEMARK OFFICE
CERTIFICATE OF CORRECTION

| | |
|---|---|
| PATENT NO. | : 11,998,139 B2 |
| APPLICATION NO. | : 17/276842 |
| DATED | : June 4, 2024 |
| INVENTOR(S) | : Christian Birkenstock |

It is certified that error appears in the above-identified patent and that said Letters Patent is hereby corrected as shown below:

In the Claims

Column 12, in Line 27, replace "foodstuffs of claim 1" with -- foodstuffs of claim 16 --.

Signed and Sealed this
Second Day of July, 2024

Katherine Kelly Vidal
*Director of the United States Patent and Trademark Office*